United States Patent

[11] 3,601,898

| [72] | Inventor | Robert C. Lokey |
| | | Box A75356, Tamal, Calif. 94964 |
| [21] | Appl. No. | 874,282 |
| [22] | Filed | Nov. 5, 1969 |
| [45] | Patented | Aug. 31, 1971 |

[54] TYPE SOLDERING GAUGE OR JIG
10 Claims, 5 Drawing Figs.

[52] U.S. Cl. ............................................. 33/183
[51] Int. Cl. .............................................. G01b 3/38
[50] Field of Search ............................. 33/183, 180 R

[56] References Cited
UNITED STATES PATENTS

| 1,573,407 | 2/1926 | Lindburg.................. | 33/183 |
| 2,758,384 | 8/1956 | Horton..................... | 33/183 |
| 2,785,475 | 3/1957 | Simpson................... | 33/183 |

*Primary Examiner*—William D. Martin, Jr.
*Attorney*—Alexander B. Blair

ABSTRACT: A self-adjusting gauge to enable the soldering of new type faces on typewriter type bars with speed and accuracy. The gauge cooperates with the typewriter platen and a single accurate typeface for preliminary placement in the correct use position. No attaching screws or other fasteners are required and the gauge is characterized by extreme simplicity and economy.

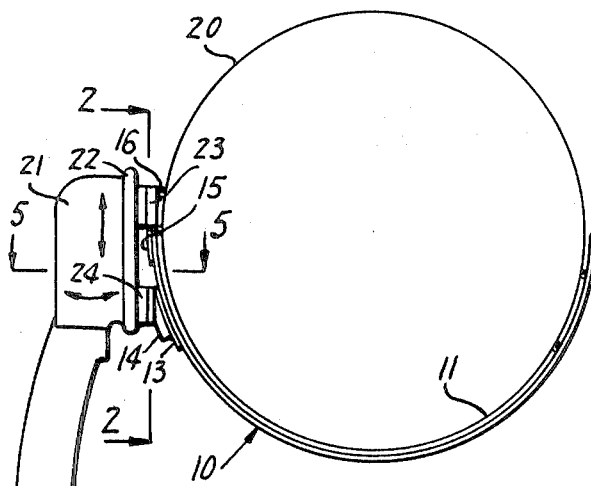
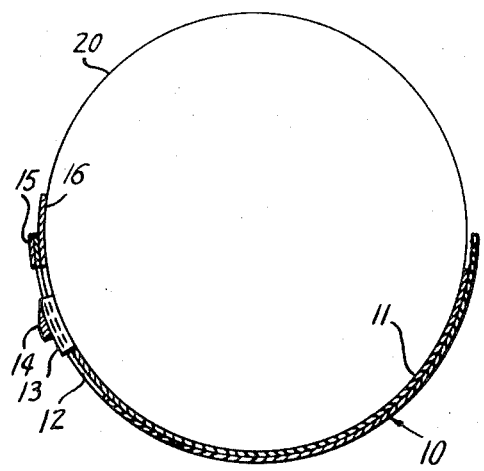
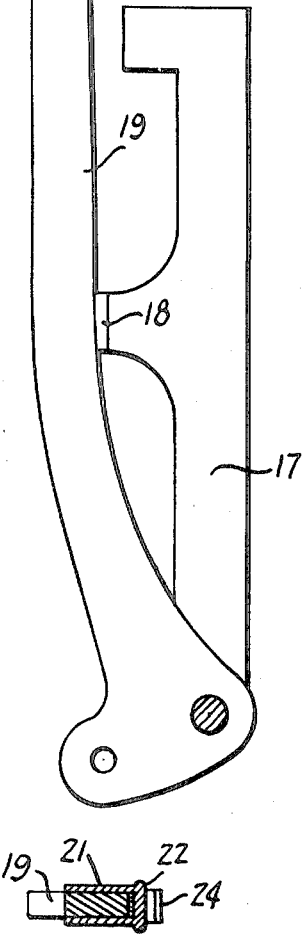
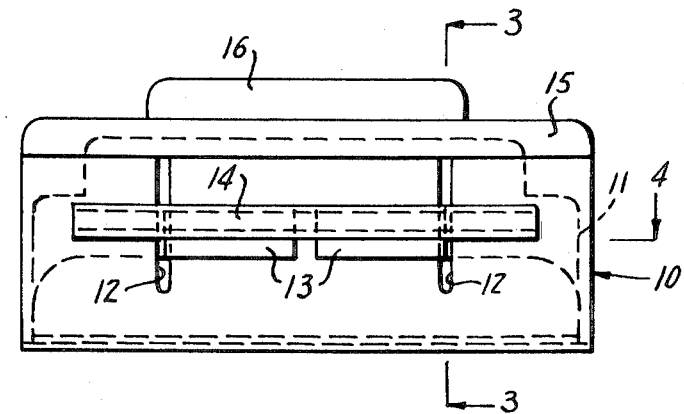
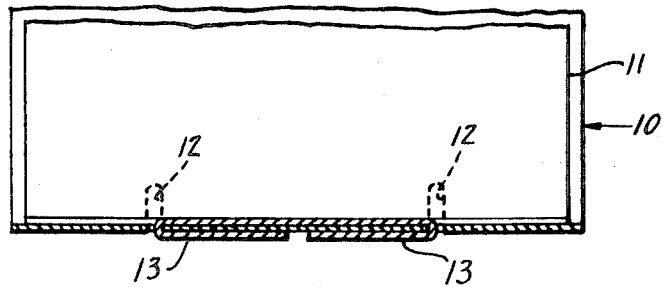

TYPE SOLDERING GAUGE OR JIG

BACKGROUND OF THE INVENTION

There is a distinct need for a practical, simplified and inexpensive device to aid typewriter repairmen in replacing worn and improperly aligned type heads in typewriters. Conventionally, three methods of soldering type heads on type bars are practiced by repairmen. The first method, and the most difficult and least used, is to remove the entire type bar from the machine and place it in a special jig for soldering, followed by reassembly. This obviously takes the typewriter out of operation for some time and is costly. The second method involves removal of the typewriter platen and the installing on the typewriter of a special fixture requiring special adapter plates and screws, the requirements varying for different makes and models of type guides and typewriters. The third and most widely used method of type soldering in a typewriter is simply trial and error requiring experience, skill and dexterity. The trial and error method is time-consuming and uneconomical.

Accordingly, the objective of this invention is to solve the difficulties of the prior art and meet the needs of the art by the provision of a very simple gauge whereby the repairman can quickly and efficiently replace defective type heads with accuracy after first placing the gauge in cooperative relationship with the typewriter platen in a very simple manner.

Other features and advantages of the invention will appear during the course of the following detailed description.

BRIEF DESCRIPTION OF THE DRAWINGS

FIG. 1 is an enlarged side elevational view of a gauge embodying the invention shown associated with a typewriter platen and type bar.

FIG. 2 is an elevational view of the gauge per se taken on line 2—2 of FIG. 1.

FIG. 3 is a vertical section through the gauge taken on line 3—3 of FIG. 2.

FIG. 4 is a horizontal section taken on line 4—4 of FIG. 2.

FIG. 5 is a horizontal section taken on line 5—5 of FIG. 1, with parts omitted. —

DETAILED DESCRIPTION OF PREFERRED EMBODIMENT

Referring to the drawings in detail, wherein like numerals designate like parts, the soldering gauge proper comprises essentially an exterior cylindrically curved body 10 of sheet metal or the like, being essentially a semicylinder, as shown in FIGS. 1 and 3. A similar interior semicylinder 11 of only slightly smaller radius is disposed immediately inwardly of the body 10 in sliding contact therewith so that the two parts may have relative movement circumferentially under circumstances to be described. The two semicylindrical body or sections 10 and 11 are of approximately the same axial length, although the interior body 11 may be slightly shorter than the body 10 as shown in FIG. 4.

Near one extremity thereof, the outer body 10 has a pair of parallel axially spaced circumferentially extending guide slots 12 formed therethrough receiving tabs 13 integral with the inner body 11, said tabs projecting movably through the slots 12 from the interior of the outer body 10 and then bent over on the exterior of the outer body. FIG. 4, forming a sliding connection therewith.

An adjustable gauge bar 14 for lowercase letters of the typeface is secured directly by soldering, welding or the like, to the outer surfaces of tabs 13 and thus the gauge bar 14 is spaced only slightly from the outer surface of the cylindrically curved outer body 10. The gauge bar 14 extends parallel to the axis of the cylindrically curved body 10 and the latter has a common axis with the inner body 11, as the two parts are concentrically formed. The gauge bar 14 preferably extends for a major portion of the axial length of the gauge structure as shown in FIG. 2, although its length may vary. As will be apparent, the thickness of the gauge bar 14 measured radially from the center of the bodies 10 and 11 will serve to position the lowercase characters on the type head being soldered to a type bar. Therefore, the element 14 movable with the interior body 11 constitutes a movable gauging element of the assembly.

At its corresponding terminal edge, the outer body 10 is provided with a fixed gauge bar 15 which in the operation of the implement serves as a locator for the uppercase letter of the particular typeface or head being soldered. A very thin bladelike lip 16 integral with the gauge bar 15 projects beyond the one edge of the outer body 10, as shown. In some cases, the element 16 may be omitted and is not absolutely essential to the proper operation of the gauge. As shown clearly in FIG. 2, the gauge bar 15 is parallel to the adjustable or movable gauge bar 14 and may extend for the full axial length of the outer body 10 for purposes of rigidity. The lip 16 may be somewhat foreshortened, as shown.

It may now be seen that the soldering gauge essentially is simply a pair of interfitting cylindrically curved shells or bodies of thin, stiff sheet material, adapted for relative movement circumferentially. Each body carries one axially extending typeface gauging bar, one for uppercase characters and the other for lowercase characters, to be used in a manner now to be described.

Continuing to refer to the drawings, certain conventional typewriter components are shown and these include the usual fixed segment 17 having an abutment ring 18 which engages each pivoted type bar 19 when the latter is in the typing position relative to the cylindrical platen 20. As shown in FIGS. 1 and 5, each type bar 19 has a type head 21 on its upper end which is conventionally soldered to the type bar 19 during initial manufacturing or when a type head, which is defective, worn or misaligned, is to be replaced by the repairman. As viewed in horizontal cross section, FIG. 5, the type head 21 is U-shaped and has a forward typeface 22 including an uppercase character 23 and a lowercase character 24. All of this construction is conventional.

OPERATION

When the invention gauge is to be utilized, the device is simply placed over the upper side of the platen 20 and in this connection, it is believed that three distinct diameter sizes of the gauge will accommodate substantially all typewriters. The gauge bar 15 at this time is toward the rear of the typewriter. The line space detent lever, not shown, is moved to release the platen for free-turning without ratchet action. The platen is now turned until the entire gauge structure moves to the bottom of the platen, as shown in the drawings, and is gripped by the paper feed rolls, not shown. Any type bar having its typeface in proper alignment and good condition is now placed in the capital letter position by pressing the shift lock key, not shown, and the particular type bar is raised up and pressed manually into contact with the platen 20 and the type bar will now be engaging abutment ring 18, as in FIG. 1.

The platen 20 is now further adjusted until the leading side edge of gauge bar 15 contacts the lower side of uppercase character 23 firmly, FIG. 1. The uppercase character 23 will prevent further movement of the gauge bar 15 and the outer body 10 with the platen 20. The repairman continues to revolve the platen 20 slightly in the same direction, clockwise in FIG. 1, and friction between the platen and the inner body 11 will move the inner body relative to the outer body 10 whose movement is arrested by the uppercase letter 23. This relative movement will advance the second gauge bar 14 into contact with the face of lowercase character 24, as shown in FIG. 1. Once the two gauging elements 15 and 14 are thus properly positioned relative to a correct type head and type characters, the mechanic can simply hold the type bar 19 against the gauge, FIG. 1, and revolve the platen 20 until it detents into its line space, without disturbing the position of the gauge. The detent roll, not shown, which normally holds the platen on a regular typing line, will now also firmly hold the gauge structure in the exact position established by the test type head 21, as described above.

The test type bar 19 is now returned to its rest position and the type head which is misaligned and needs soldering or complete replacement in some instances is heated and the type head is removed and cleaned in the regular manner. The type bar, without the type head, is ten raised to contact the abutment ring 18 and the type head to be soldered is placed over the type bar and is preferably precrimped to some extent so as to grip the type bar frictionally when adjusted thereon. As shown by the two arrows on the type head 21 in FIG. 1, the channel-shaped type head may now be adjusted angularly and longitudinally, as required. It is so adjusted until the uppercase character 23 bottoms against the gauge bar 15 and the face of character 24 contacts the side of the lower gauge bar 14. This properly positions the type head on the type bar with proper ring and cylinder and perfect feet and motion adjustment. The type bar and head are now brought back to rest and soldered in the usual manner. The gauge is readily removed by simply rolling the platen forward until the gauge reaches the upper side thereof and can be lifted off.

An important virtue of this gauge is that even though the entire set of keys is bent out of adjustment regarding ring and cylinder and individual motion, any type head soldered with the use of the gauge will bring that particular piece of type into alignment.

A significant feature of the gauge in comparison to prior art devices is that it is self-adjusting through the platen to bring the second gauge bar 14 into contact with the lowercase character 24 of the test head. The operation is so simple as to involve no more than pressing the gauge over the platen, raising a test type bar and rolling the platen until the gauge elements are properly seated in the described manner against the test characters 23 and 24. It is believed that a repairman using the invention gauge can substantially complete a type soldering operation before conventional devices for the same general purpose can even be set up for use on the typewriter. The simplicity and convenience of the gauge should serve to lead the repairman away from the costly, slow and haphazard trial and error method of soldering now commonly practiced in the trade. The many features and advantages of the invention should now be clear to those skilled in this art without further description.

I claim:

1. A type soldering gauge for typewriters comprising interfitting substantially cylindrically curved gauge bodies adapted for relative movement circumferentially and being of a size to engage about a typewriter platen and to turn with the platen to a use position on the typewriter, a first gauge element for uppercase type characters on one gauge body movable with said one gauge body and the typewriter platen into abutment with the base of an uppercase character on a particular type bar, and a second gauge element on the other gauge body relatively movable with respect to the first gauge element and moving with the other gauge body and said platen into face-to-face contact with a lowercase character so as to establish a correct working position of the soldering gauge.

2. The structure of claim 1, and wherein the first gauge element is a bar secured to one terminal edge of the exterior one of said gauge bodies and the second gauge element is a like bar secured to a corresponding terminal portion of the interior one of said gauge bodies, said like bar disposed adjacent the outer surface of the exterior gauge body, and guiding connecting means for said like bar and interior gauge body.

3. The structure of claim 1, wherein said curved gauge bodies are inner and outer thin-walled bodies each substantially semicylindrical and being relatively slidable circumferentially, the outer gauge body having circumferentially extending guide means, coacting guide means on the inner gauge body engaging the guide means of the outer gauge body and the second gauge element secured to said coacting guide means and being in opposed relation circumferentially to the first gauge element.

4. The structure of claim 3, wherein the first and second gauge elements are a pair of parallel axially extending bars with the first gauge element secured to the outer gauge body fixedly.

5. The structure of claim 3, wherein the first guide means comprises a pair of parallel circumferential slots in the outer gauge body and the coacting guide means is a pair of tabs on the inner gauge body engaging through said slots and being movable therein circumferentially of said bodies.

6. The structure of claim 5, wherein said first and second gauge elements are axially extending barlike elements on the exterior surface of the outer gauge body with the first gauge element having a longitudinal edge adapted to abut the bottom side of an uppercase character, the second gauge element having a certain radial thickness to position the print face of a lowercase character when the outer side of the second gauge element is moved circumferentially into abutment with said print face.

7. The structure of claim 6, and a thin projecting lip on the terminal edge of the outer gauge body carrying the first gauge element, said lip projecting beyond one side of the first gauge element.

8. The structure of claim 6, wherein the second barlike gauge element is tapering in cross section whereby in the gauging position the outer gauging face of the second gauge element will approximately parallel the print face of the lowercase character which it abuts.

9. The structure of claim 1, wherein said gauge bodies are a pair of sheet metal substantially semicylindrical bodies interfitting one within the other slidably, and means to guide said bodies relatively during circumferential movement.

10. The structure of claim 9, wherein said means to guide comprises slots in the outer gauge body and parts on the inner gauge body projecting movably within said slots.